United States Patent
El-Marouani et al.

(10) Patent No.: US 10,033,528 B2
(45) Date of Patent: Jul. 24, 2018

(54) METHOD OF COMMUNICATING BETWEEN A SERVER AND A SECURE ELEMENT

(71) Applicant: GEMALTO SA, Meudon (FR)

(72) Inventors: Abdellah El-Marouani, Gemenos (FR); André Sintzoff, Gemenos (FR); Julien Glousieau, Gemenos (FR); Ilyas Landikov, Gemenos (FR); Christophe Ronfard-Haret, Gemenos (FR); Xavier Berard, Gemenos (FR)

(73) Assignee: GEMALTO SA, Meudon (FR)

( * ) Notice: Subject to any disclaimer, the term of this patent is extended or adjusted under 35 U.S.C. 154(b) by 154 days.

(21) Appl. No.: 15/022,485

(22) PCT Filed: Sep. 9, 2014

(86) PCT No.: PCT/EP2014/069152
§ 371 (c)(1),
(2) Date: Mar. 16, 2016

(87) PCT Pub. No.: WO2015/039923
PCT Pub. Date: Mar. 26, 2015

(65) Prior Publication Data
US 2016/0234013 A1    Aug. 11, 2016

(30) Foreign Application Priority Data
Sep. 17, 2013    (EP) .................................. 13306272

(51) Int. Cl.
*H04L 9/32* (2006.01)
*H04L 9/06* (2006.01)
(Continued)

(52) U.S. Cl.
CPC ........ *H04L 9/0643* (2013.01); *H04L 63/0428* (2013.01); *H04W 4/50* (2018.02);
(Continued)

(58) Field of Classification Search
CPC ..... H04L 9/0643; H04L 63/0428; H04L 9/32; H04L 9/08; H04L 9/3271; H04W 12/08;
(Continued)

(56) References Cited

U.S. PATENT DOCUMENTS 6,981,245 B1 * 12/2005 Schwabe ............. G06F 9/44589
713/155
2004/0221273 A1 * 11/2004 Sandham ............ G06F 9/44589
717/134
(Continued)

OTHER PUBLICATIONS

International Search Report (PCT/ISA/210) dated Nov. 20, 2014, by the European Patent Office as the International Searching Authority for International Application No. PCT/EP2014/069152.
(Continued)

*Primary Examiner* — Jayesh M Jhaveri
(74) *Attorney, Agent, or Firm* — Buchanan Ingersoll & Rooney PC

(57) ABSTRACT

The invention is a method of communicating between a server and a distant secure element through a point-to-point link. The server is provided with a set comprising a plurality of data and a plurality of identifiers, each of the data is associated with one of the identifiers. The plurality of data comprises a first data compatible with the distant secure element and a second data incompatible with the distant secure element. The whole set is sent from the server to the distant secure element through the point-to-point link. A control operation is run with respect to a reference value stored in the distant secure element for each identifier. The data associated with the identifiers for which the control operation failed is discarded.

12 Claims, 2 Drawing Sheets

(51) Int. Cl.
*H04W 4/50* (2018.01)
*H04L 29/06* (2006.01)
*H04W 12/08* (2009.01)
*H04W 8/00* (2009.01)
*H04W 8/18* (2009.01)
*G06F 9/445* (2018.01)
*H04L 9/08* (2006.01)
*H04W 12/02* (2009.01)

(52) U.S. Cl.
CPC ............. *H04W 12/08* (2013.01); *G06F 9/445* (2013.01); *G06F 9/44589* (2013.01); *H04L 9/08* (2013.01); *H04L 9/3271* (2013.01); *H04W 8/005* (2013.01); *H04W 8/183* (2013.01); *H04W 12/02* (2013.01)

(58) Field of Classification Search
CPC . H04W 4/005; H04W 8/183; H04W 12/0428; H04W 8/005; G06F 9/445; G06F 9/44589
See application file for complete search history.

(56) References Cited

U.S. PATENT DOCUMENTS

| | | | |
|---|---|---|---|
| 2008/0228865 A1* | 9/2008 | Cruzada | H04L 67/10 709/203 |
| 2009/0191857 A1* | 7/2009 | Horn | H04W 4/00 455/419 |
| 2013/0145139 A1* | 6/2013 | Adam | G06F 21/40 713/2 |
| 2014/0073289 A1* | 3/2014 | Velasco | H04W 12/04 455/411 |

OTHER PUBLICATIONS

Written Opinion (PCT/ISA/237) dated Nov. 20, 2014, by the European Patent Office as the International Searching Authority for International Application No. PCT/EP2014/069152.

Cadonau, J., "Chapter 11: OTA and Secure SIM Lifecycle Management", Smart Cards, Tokens, Security and Applications, pp. 257-275 (Jan. 1, 2008) XP009129407.

* cited by examiner

METHOD OF COMMUNICATING BETWEEN A SERVER AND A SECURE ELEMENT

FIELD OF THE INVENTION

The present invention relates to methods of communicating between a server and a secure element through a network. It relates particularly to methods of communicating between two entities in point-to-point mode.

BACKGROUND OF THE INVENTION

Secure elements are small devices comprising a memory, a processor and an operating system for computing treatments. Such secure elements may comprise a plurality of memories of different types, like non-volatile memory and volatile memory. They are called "secure" because they are able to control the access to the data they contain and to authorize or not the use of data by other machines. The secure elements may also provide computation services based on cryptographic components. In general, secure elements have limited computing resources and limited memory resources and they are intended to be connected to a host machine which provides them with electric power. Secure elements may be removable or fixed to a host machine. For example, smart cards are a kind of secure elements.

A secure element may also be implemented as a virtual entity embedded in a tamper proof device. Such a virtual entity is implemented in software and behaves like a hardware secure element.

Secure elements may be accessed by a remote server via a wireless channel, a wired network, like Internet or through a combination of networks. The remote server communicates with a secure element through a communication session established through a point-to-point link.

A point-to-point link is a communication connection established between two entities. This is different from point-to-multipoint or broadcast communication topology in which several receivers receive information transmitted by one transmitter. These two communication architectures belong to distinct technical domains which have their own technical solutions.

Some secure elements that are intended to be used in Telecom domain or Machine-To-Machine (M2M) domain can be able to manage an OTA (Over-The-Air) channel. These secure elements may also be accessed through the HyperText Transfer Protocol, usually called HTTP or HTTPS for the secure mode. Thus, a distant server can remotely manage the content of a secure element like an UICC (Universal Integrated Circuit Card) through a dedicated communication session using a specific protocol. The server may use by example the RAM (Remote Applet Management) mechanism as defined by GlobalPlatform® v 2.2 standard—Amendment B "RAM over HTTP" or the OMA-DM (Open Mobile Alliance—Device Management) protocol as defined by OMA-TS-DM V1.2.1 standard.

A remote server may be in charge of deploying data in a group of secure elements already deployed on the field. For instance, the data to be deployed may be a script of commands, a new application, an upgrade of an application or even an upgrade of the operating system itself. The data to be deployed may also be applicative data like a new configuration setting or secret data.

Some data is suitable for a configuration of a secure element and incompatible with a different configuration of another secure element. A device configuration may depend on the hardware components and/or the embedded software elements. For example, the configuration may be defined by the operating system version, a profile or a specific data installed in the secure element. The server should take care of any inconsistencies between the secure element configuration and the data to send. In addition, the server must communicate with a huge number of secure elements.

The diversity of the configurations of deployed secure elements is increasing dramatically. This trend increases the complexity of the processing that the server needs to perform to deploy correctly data on the existing fleet of secure elements.

There is a need for improving the way to manage the sending of data from a server to a distant secure element.

SUMMARY OF THE INVENTION

An object of the invention is to solve the above mentioned technical problem.

The object of the present invention is a method of communicating between a server and a distant secure element through a point-to-point link. The distant secure element comprises a reference value. The method comprises:
- a step of providing the server with a set comprising a plurality of data and a plurality of identifiers, each of said data of the plurality of data being associated with an identifier belonging to the plurality of identifiers. The plurality of data comprises a first data which is compatible with the distant secure element and a second data which is incompatible with the distant secure element.
- a step of sending the whole set from the server to the distant secure element through the point-to-point link,
- at the distant secure element, a step of performing a control operation with respect to the reference value for each identifier of the plurality of identifiers and discarding the data associated with the identifiers for which the control operation failed.

Advantageously, the distant secure element may have been issued by a manufacturer and may have a device release. The reference value may reflect the manufacturer or the device release.

Advantageously, the distant secure element may comprise an operating system having a release version and the reference value may reflect the release version.

Advantageously, one data of the plurality of data may be an executable component which is installed into the distant secure element in case of successful control operation of the identifier associated with the executable component and the executable component may modify the behavior of the operating system.

Advantageously, the executable component may be a native component.

Advantageously, the identifier associated with the native component may be computed by using a cryptographic hash of the release version.

Advantageously, one data of the plurality of data may be a command which is executed on the distant secure element in case of successful control operation of the identifier associated with the command.

Advantageously, the distant secure element may generate a list of all data associated with an identifier for which the control operation failed and the distant secure element may send the list to the server.

Another object of the invention is a server configured to distribute data to a distant secure element. The server includes a set comprising a plurality of data and a plurality of identifiers. Each of said data of the plurality of data is associated with an identifier belonging to the plurality of identifiers. The plurality of data comprises both a first data compatible with the distant secure element and a second data incompatible with the distant secure element. The server is configured to send the whole set to the distant secure element through the point-to-point link.

Advantageously, a system may comprise both the server of the invention and a fleet of secure elements configured for remotely communicating with the server. Each of the secure elements may comprise its own reference value and may be configured to receive the whole set from the server in point-to-point mode. Each secure element of the fleet may be configured to perform a control operation with respect to its own reference value for each identifier comprised in the set and to discard the data associated with the identifiers for which the control operation failed.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of server intended to communicate with many secure elements having different configurations.

The invention may apply to any types of data intended to be loaded into a secure element. For example, the loaded data may be files, HTML pages, scripts, applications, applications' upgrades, firmware, operating system upgrades, applicative data or secret data.

Figure 1:
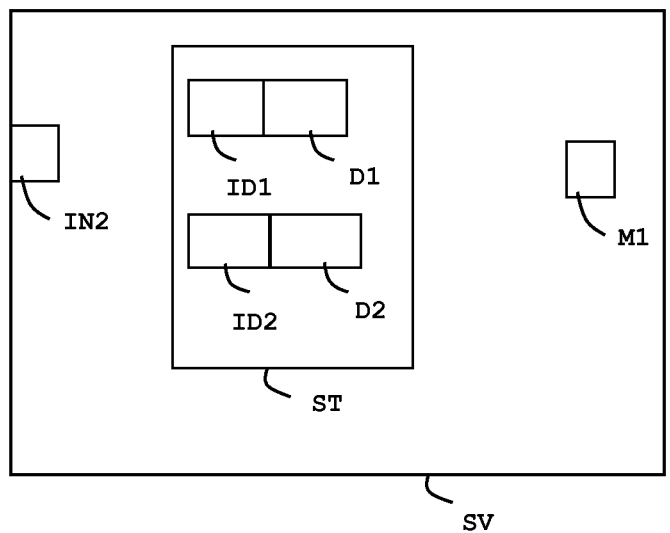
FIG. 1 is an example of a server according to the invention.

FIG. 1 shows an example of a server SV according to the invention.

In this example, the server SV is a computer machine comprising a communication interface IN2 able to communicate with any secure element belonging to a fleet FL through a point-to-point link. For instance, the server may be able to establish communication channel via OTA with a secure element like an UICC. In this case, the server accesses the secure element through a host machine like a mobile phone. The server SV comprises a set ST comprising data D1 and D2 which are intended to be sent to a plurality of secure elements. The data D1 is compatible with a secure element while the second data D2 is incompatible with this secure element. The second data D2 is suitable for another secure element of the fleet FL.

The server SV comprises a sending element M1 which is configured to send the whole set ST to any secure element SE1 connected through the point-to-point link and belonging to the fleet FL.

For instance, the set ST may be a script and the data D1 and D2 are commands intended to be executed into secure elements of the fleet FL.

In another example, the data D1 and D2 may be a part of operating system code or an application which is intended to be loaded by a generic load command.

The set ST comprises the identifiers ID1 and ID2 which are respectively associated with data D1 and D2.

The value of each of these identifiers allows a secure element to determine if the associated data is compatible with its own configuration. The identifier (also called tag, flag or marker) may be coded in one or two bytes for example.

Figure 2:
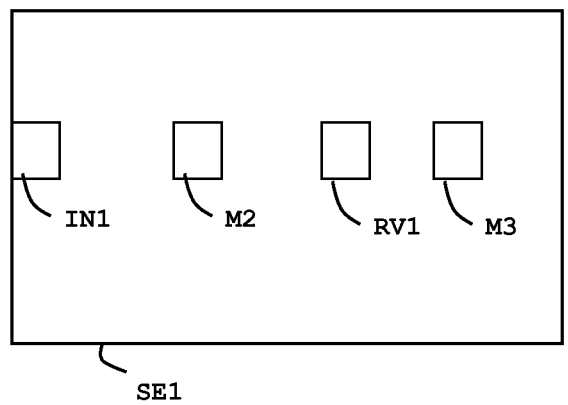
FIG. 2 is an example of a secure element according to the invention.

FIG. 2 shows an example of a secure element SE1 according to the invention.

The secure element may be an autonomous device or an electronic token connected to a host machine which provides access to the remote server SV. The secure element may also be a virtual secure element embedded in a tamper proof device.

In particular, the secure element may contain a processor, a non volatile memory, a working memory and an operating system. The operating system OS may comprise a virtual machine, in particular a JavaCard® virtual machine, a Java® virtual machine or a .Net® virtual machine. The processor cooperates with the working memory and is intended to run the operating system.

In the example of FIG. 2, the secure element SE1 is a device comprising a communication interface IN1 able to communicate through a point-to-point link with the server SV of FIG. 1. This communication interface may be a contactless or a contact interface. The secure element SE1 belongs to the fleet FL managed by the distant server.

The secure element SE1 comprises a reference value RV1 and an analyzer M2 configured to perform a control operation with respect to its own reference value RV1 for each identifier comprised in the set received from the server SV. The analyzer M2 is configured to discard the data associated with the identifiers for which the control operation failed. In other words, the analyzer M2 guarantees that data which is not compatible with the secure element SE1 is neither executed nor permanently stored into the secure element SE1.

With reference to the example of the set ST of FIG. 1, the analyzer M2 uses the reference value RV1 to determine what command is suitable for the secure element SE1. In a preferred embodiment, the analyzer M2 just compares the value of each identifier with the reference value RV1 for making a decision.

In one example, the reference value RV1 may reflect the release version of the operating system of the secure element SE1.

In another example, the reference value RV1 may reflect the device release of the secure element SE1. The device release corresponds to the combination of hardware and/or software features of the secure element. The device release may be defined by the set of capabilities of the secure element.

For instance, the device release may correspond to the generation number of the secure element (i.e. a number identifying the range to which the secure element belongs) or a specific computed number associated with the secure element. The device release may also vary according to the presence of a component providing a specific feature, like NFC or cryptographic functions. The device release may also correspond to a version of standard implemented in the secure element.

In another example, the reference value RV1 may reflect the manufacturer that deliver the secure element.

In another example, the reference value RV1 may reflect any combination of criteria mentioned above.

In other words, the reference value allows identifying the configuration of the secure element.

The secure element SE1 may comprise a reporting means M3 configured to generate a report reflecting the result of every control operations carried out by the analyzer M2. For instance, the reporting means M3 may build a list comprising a reference to the data of the received set for which the control operation succeed. Alternatively, the list may correspond to the data of the received set for which the control operation failed.

Advantageously, the analyzer M2 may perform the control operation by executing a function which is more complex than a simple comparison operation. For instance, the analyzer M2 may apply the identifier to a cryptographic function to get a result which is then compared with the reference value.

Advantageously, the analyzer M2 may be configured to immediately erase the data associated with an identifier whose control operation failed.

The operating system of the secure element may rely on native components. A native component is a software component developed in a language specific to the embedded microprocessor. This specific wording means that a native component is not developed in a language associated with a virtual machine, like the Java© language. For instance, a native component may be developed in assembly language or in C language. Thus a native component is not a generic component and is not compatible with a large number of hardware platforms.

In another example, the set ST comprises a collection of native components corresponding to different hardware targets. Each identifier may be the result of cryptographic hash function of a part (or the whole) of the targeted Operating system. Thus the analyzer M2 may perform the control operation by computing the hash of the operating system stored into the secure element and comparing the computed hash with every received identifier.

Advantageously, the identifier may be computed using a specific function taking into account a hash of the targeted operating system as input parameter. For example, the specific function may be the concatenation of the hash and of a reference of the device release as detailed above.

In another example, the identifier may be based on the build version which produced the operating system active in the secure element.

In another example, the set ST comprises a collection of components developed in a high level language like JavaCard© and corresponding to different version of virtual machines. The set ST may also comprise a collection mixing native components and components developed in a high level language.

The invention allows protecting the deployed secure elements by avoiding unwanted modification of their behavior since each secure element is now able to retrieve the correct data among the whole set received from the server.

Figure 3:
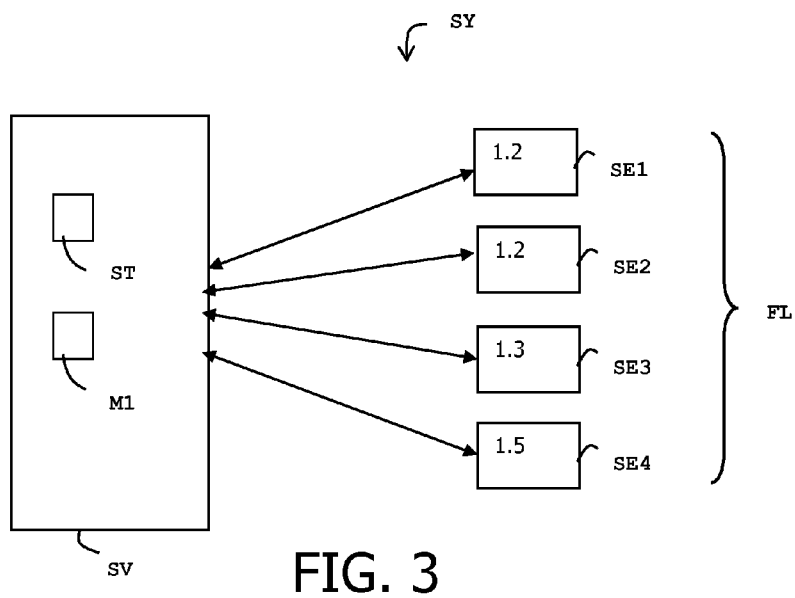
FIG. 3 depicts an example of a system comprising a server and a fleet of secure elements according to the invention.

FIG. 3 shows an example of a system SY comprising a server SV and a fleet FL of secure elements according to the invention.

In this example, the server SV is similar to the server described at FIG. 1. The server SV comprises a set ST of data intended to be distributed to every secure element of the fleet FL.

In this example, the fleet FL comprises four secure elements SE1, SE2, SE3 and SE4. Each of these secure elements has an architecture similar to the one described at FIG. 2. Each of these secure elements comprises its own reference value. For instance, the secure elements SE1 and SE2 may have the same reference value corresponding to the version 1.2 of operating system, while the secure element SE3 has a reference value corresponding to the version 1.3 and the secure element SE4 has a reference value corresponding to the version 1.5.

Advantageously, the server SV may communicate with multiple fleets of secure elements and manage as many different sets of data to be distributed.

Figure 4:
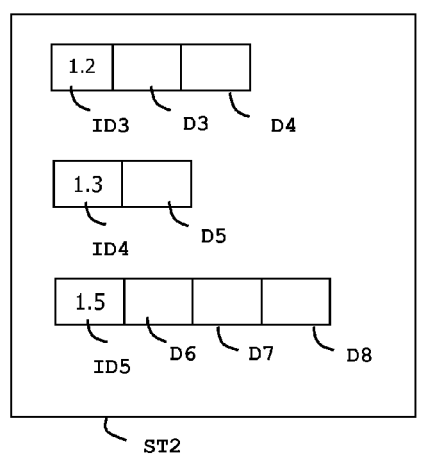
FIG. 4 shows an example of a set of data sent by the server according to the invention.

FIG. 4 shows an example of a set ST2 of data send by the server SV to the secure elements of the fleet FL.

In this example, the set ST2 is a script of ordered commands. The script comprises two commands D3 and D4 which are associated with the identifier ID3, a command D5 associated with the identifier ID4 and three commands D6, D7 and D8 which are associated with the identifier ID5. The identifier ID3 has a value corresponding to the version 1.2 of operating system while the identifier ID4 has a value corresponding to the version 1.3 and the identifier ID5 has a value corresponding to the version 1.5.

With reference to the example of the fleet FL of FIG. 3, the secure elements SE1 and SE2 will receive the full set ST2 and execute the commands D3 and D4 which are associated with the identifier ID3. They will discard the commands D5 to D8. The same way, the secure element SE3 will execute the command D5 and discard the other commands of the script. The secure elements SE4 will receive the full set ST2 and execute the commands D6, D7 and D8 and discard the commands D3 to D5.

Figure 5:
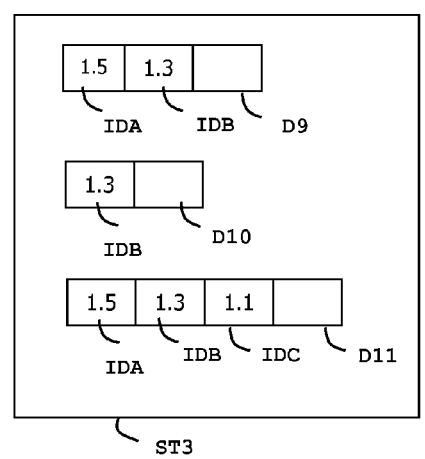
FIG. 5 depicts shows another example of a set of data sent by the server according to the invention.

FIG. 5 shows an example of a set ST3 of data send by the server SV to the secure elements of the fleet FL.

In this example, the set ST3 is a script of ordered commands. The script comprises a command D9 which is associated with the identifiers IDA and IDB, a command D10 associated with the identifier IDB and a command D11 associated with the identifiers IDA, IDB and IDC.

The identifier IDA has a value corresponding to the version 1.5 of operating system while the identifier IDB has a value corresponding to the version 1.3 and the identifier IDC has a value corresponding to the version 1.1.

With reference to the example of the fleet FL of FIG. 3, the secure elements SE1 and SE2 will receive the whole set ST3 and discard all the commands of the script without executing any commands. This is due to the fact that no command is associated with an identifier having a value corresponding to the reference value of these secure elements. The secure element SE3 will execute the commands D9, D10 and D11. The secure element SE4 will execute the commands D9 and D11 only.

Advantageously, the set sent by the server may comprise a wildcard identifier indicating that the data attached to it is intended for all recipients.

In the case of secure element of UICC type, the identifier may be implemented using the Expanded Remote Application data format which is defined in the TS 102.226 standard Release 9 or upper. The command TLVs (Tag-Length-Value) which are in the chaining of commands may be use for conveying the identifier. These command TLVs are described in the TS 102.223 Standard release 9 or upper. In particular, the mechanism of Comprehension-TLV (C-TLV) may be extended for managing the identifier.

Thanks to the invention, the server can manage a single version of the set of data to be sent whatever the diversity of the targeted secure elements. There is no risk that a secure element tries to execute an unsupported command sent by the server, knowing that such an execution attempt may lead to a definitive locking of the secure element. Thus the invention avoids that a wrong download could definitively damage a secure element which cannot be replaced, for example if the secure element is soldered in a hosting device.

Thanks to the invention, the server is no longer required to manage content specifically tailored for each sending of data to a secure element.

The invention allows an auto-protection of a secure element by avoiding erroneous and dangerous updates of its own configuration.

The invention claimed is:

1. A computer-implemented method of communicating between a server and a distant secure element through a point-to-point link, said distant secure element comprising a reference value, said server being a computing machine comprising a processing device, wherein said method comprises the following steps:
    providing the server with a set comprising a plurality of data and a plurality of identifiers, each of said data of the plurality of data being associated with an identifier belonging to the plurality of identifiers,
    sending the whole set from the server to the distant secure element through the point-to-point link,
    at the distant secure element, performing a control operation with respect to the reference value for each identifier of the plurality of identifiers and discarding the data associated with the identifiers for which the control operation fails, the control operation being performed by checking that each of said identifiers is individually linked to the reference value by a predefined mathematical function that is executed by the distant secure element,
    wherein said plurality of data comprises both a first data compatible with the distant secure element for which the control operation is successful and a second data incompatible with the distant secure element for which the control operation fails.

2. The method according to claim 1, wherein the distant secure element has been issued by a manufacturer and has a device release and wherein said reference value reflects the manufacturer or the device release.

3. The method according to claim 1, wherein the distant secure element comprises an operating system having a release version and wherein said reference value reflects the release version.

4. The method according to claim 3, wherein one data of the plurality of data is an executable component which is installed into the distant secure element in case of successful control operation of the identifier associated with the executable component and wherein the executable component is an upgrade of said operating system.

5. The method according to claim 4, wherein the executable component is a native component.

6. The method according to claim 5, wherein the identifier associated with the native component is computed by using a cryptographic hash of the release version.

7. The method according to claim 1, wherein one data of the plurality of data is a command which is executed on the distant secure element in case of successful control operation of the identifier associated with the command.

8. The method according to claim 1, wherein the distant secure element generates a list of all data associated with an identifier for which the control operation failed and wherein the distant secure element sends the list to the server.

9. A server configured to distribute data to a distant secure element comprising a reference value, the server being a computing machine comprising a processing device and comprising a set comprising a plurality of data and a plurality of identifiers, each of said data of the plurality of data being associated with an identifier belonging to the plurality of identifiers, wherein the server is configured to send the whole set to the distant secure element through a point-to-point link,
    wherein the sent whole set causes the distant secure element to perform a control operation with respect to the reference value for each identifier of the plurality of identifiers and discard the data associated with the identifiers for which the control operation fails, the control operation being performed by checking that each of said identifiers is individually linked to the reference value by a predefined mathematical function that is executed by the distant secure element,
    wherein said plurality of data comprises both a first data compatible with the distant secure element for which the control operation is successful and a second data incompatible with the distant secure element for which the control operation fails.

10. A system comprising a server and a distant secure element configured for remotely communicating with the server,
    wherein the server is a computer device comprising a processing device, wherein the server further comprises a set comprising a plurality of data and a plurality of identifiers, each of said data of the plurality of data being associated with an identifier belonging to the plurality of identifiers, wherein the server is configured to send the whole set to the distant secure element through a point-to-point link,
    wherein the distant secure element comprises its own reference value and is configured to receive the whole set from the server in point-to-point mode, and
    wherein the distant secure element is configured to perform a control operation with respect to its own reference value for each identifier comprised in the set and to discard the data associated with the identifiers for which the control operation failed, the control operation being performed by checking that each of said identifiers is individually linked to the reference value by a predefined mathematical function which is executed by the distant secure element,
    wherein said plurality of data comprises both a first data compatible with the distant secure element for which the control operation is successful and a second data incompatible with the distant secure element for which the control operation fails.

11. The method according to claim 1, wherein the predefined mathematical function is a cryptographic function.

12. The system according to claim 10, wherein the predefined mathematical function is a cryptographic function.

* * * * *